Patented May 29, 1934

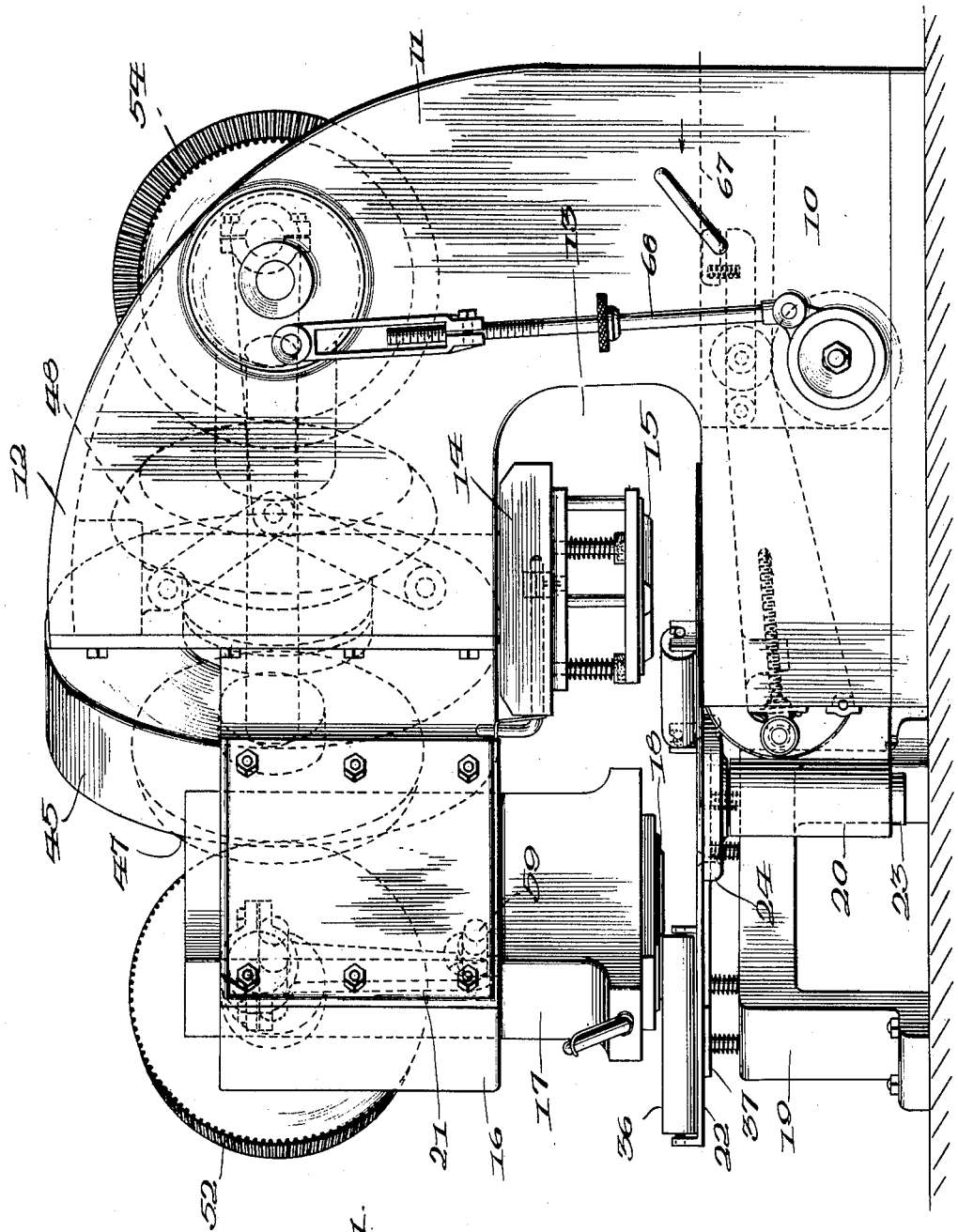

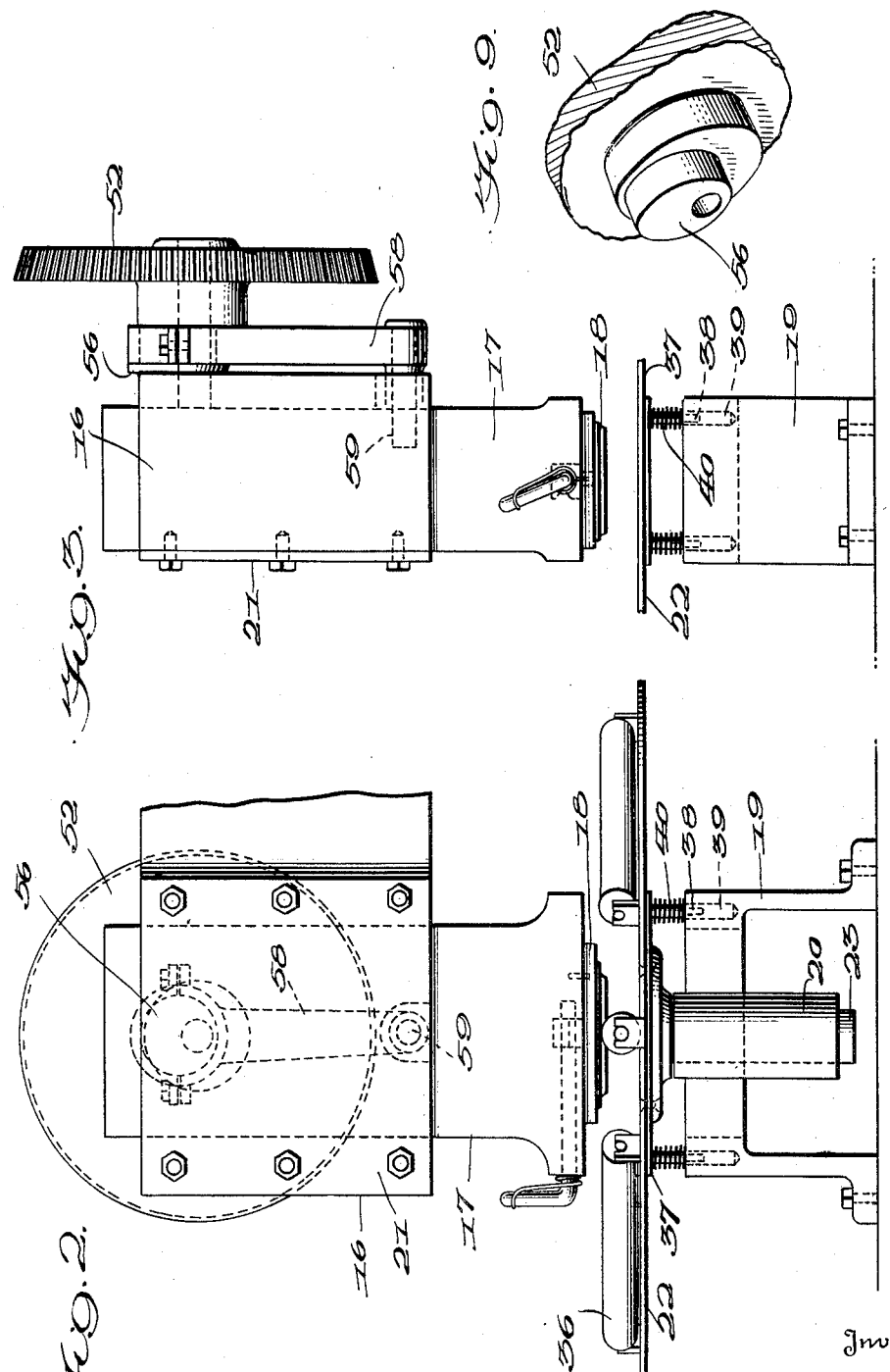

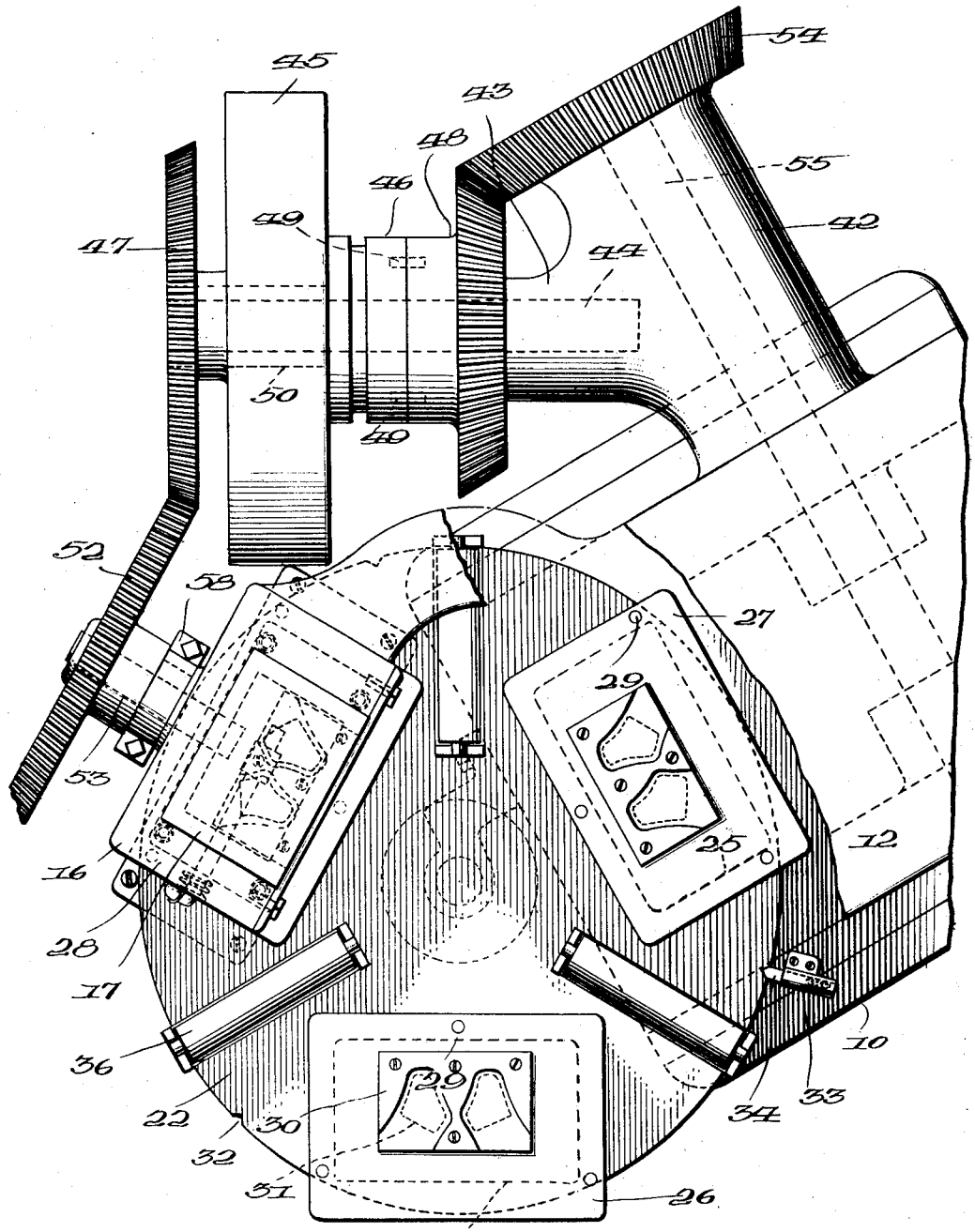

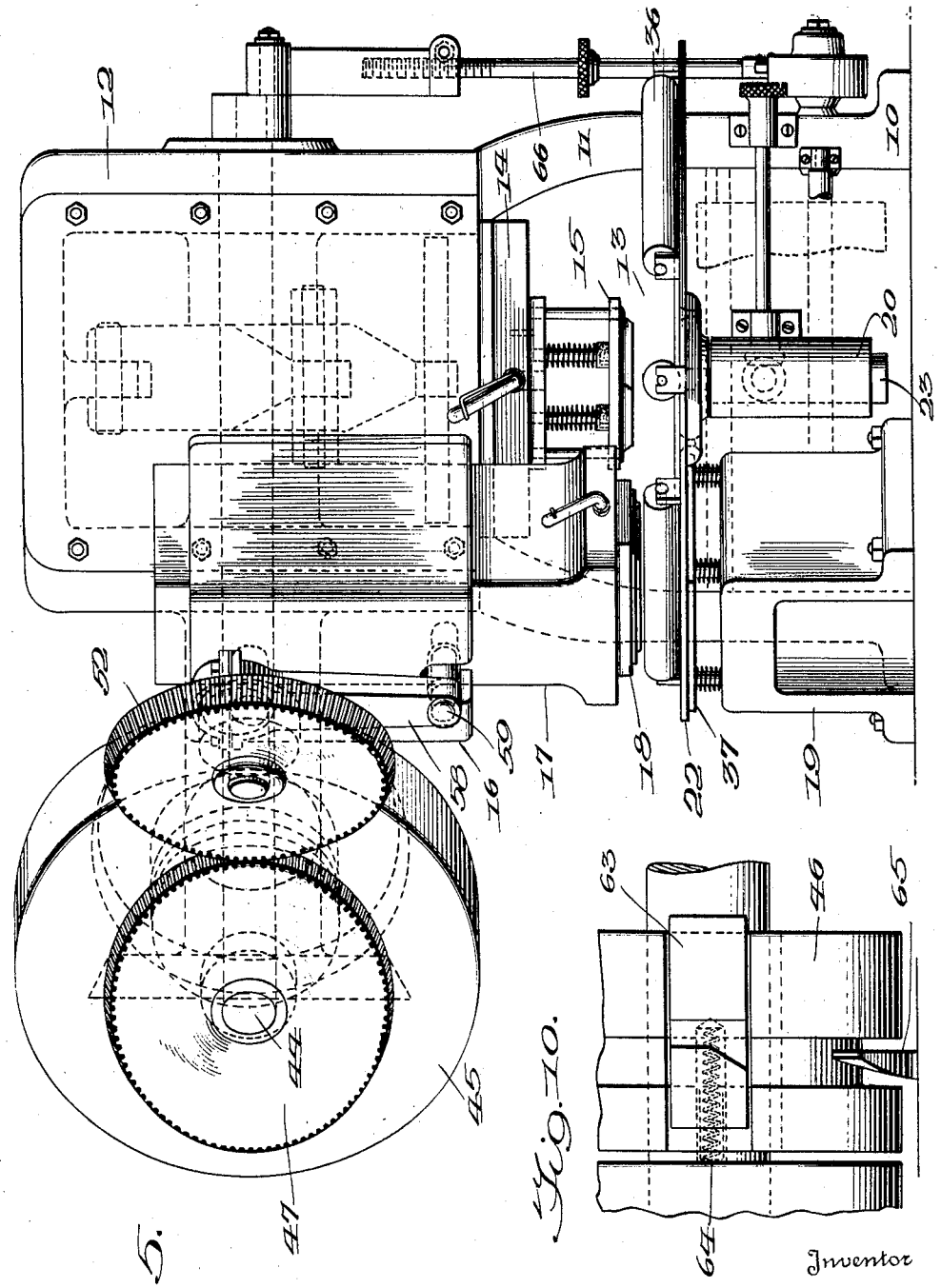

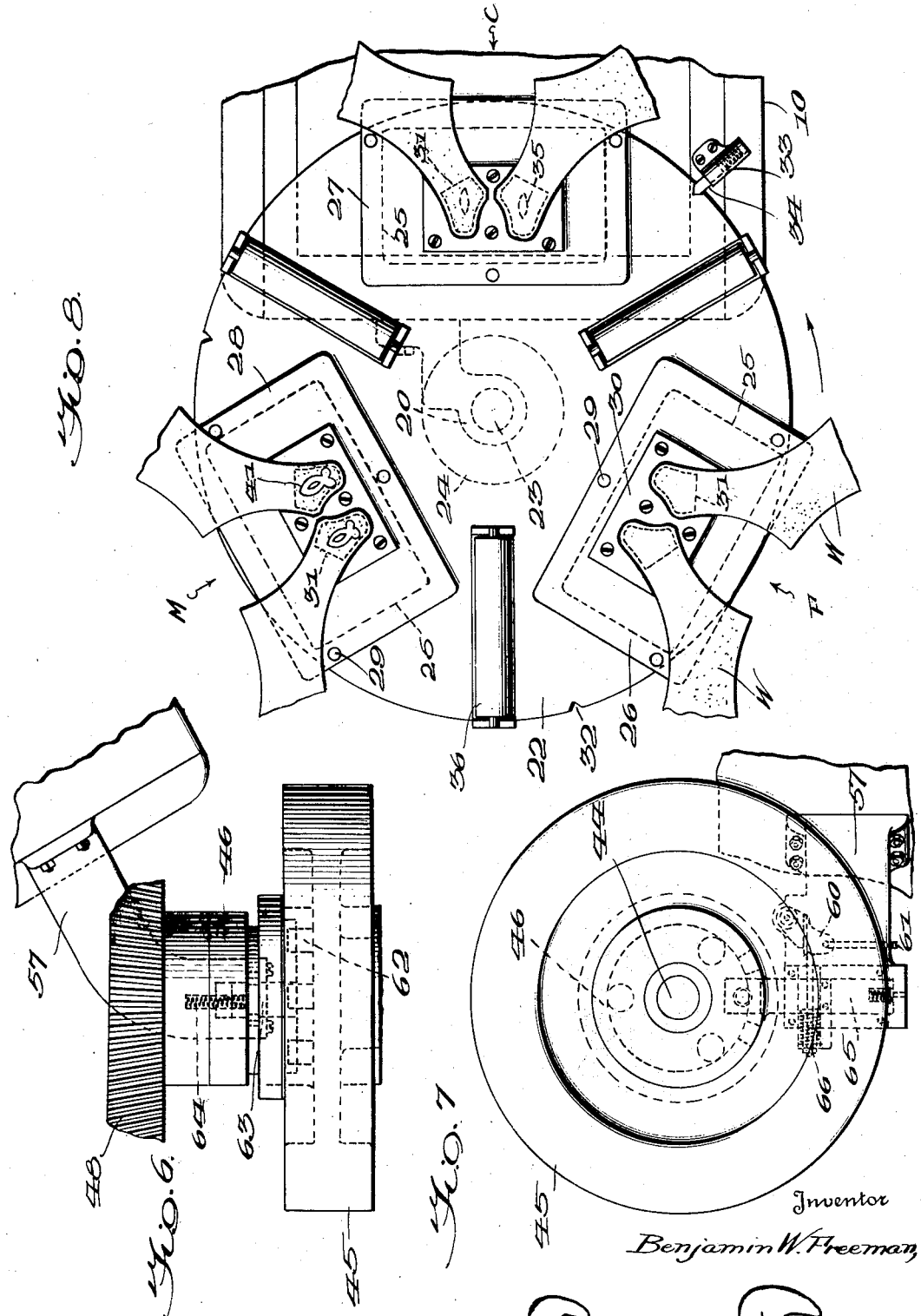

1,960,486

UNITED STATES PATENT OFFICE 1,960,486

ORNAMENTING MACHINE

Benjamin W. Freeman, Cincinnati, Ohio

Application June 3, 1932, Serial No. 615,208

27 Claims. (Cl. 101—316)

This invention relates to shoe ornamenting machinery of a type adapted for operations upon skins, upper blanks, and the like.

Among the objects of the invention is the formation of ornamental designs on and in the work, by the application of a stamped or printed marking which may simulate stitching or may take the form of a design, by the production of ornamental cutouts in the work, or by combinations of both, and in marking and cutting simultaneously, or during a continuous cycle of operations.

More particularly it is contemplated that a work piece may be marked simultaneously with the perforating of another portion thereof, or of a different piece of work at another point. Provision is made for marking a piece of work at one point and then perforating or cutting out the marked portion at another point, the work being maintained in a definite predetermined relation to the marking and cutting dies. The order of operations may be varied by first perforating and subsequently marking, but usually the marking and cutting will be performed as a continuous cycle of operations, insofar as the individual work piece is concerned.

Another object contemplates the application of marking to the work which may be used as a guide for subsequent operations, such as perforating, stitching or aligning of shoe parts with respect to each other.

The machine illustrated herein utilizes a movable carriage or table, upon which the work is mounted, and power operated means for moving the cutting and marking dies into and out of ornamenting relation to the work. While the preferred form utilizes a rotary table having the marking and cutting stations disposed about its periphery, obviously an endless carrier or reciprocating table would operate to advantage with the stations arranged in line.

Means are provided for accurately positioning work on the table, and for locating and holding the table and work positioning means in definite predetermined relation to the dies prior to, and during an ornamenting operation.

A further object of the present invention is to provide an inking means for the marking dies, mounted upon or connected to the table for movement therewith to ensure an inking of the marking die immediately prior to each operation of such die.

It should be pointed out that this machine is adapted to the use of other ornamenting materials than ink, examples being pigment, gold leaf, silver leaf, etc.; use of the term "ink" herein and in the claims is intended to cover any such equivalent material.

To the attainment of the above and other objects which will appear as the description proceeds, reference may be made to the accompanying drawings, in which:—

Fig. 1 is a side elevation of the machine;

Fig. 2 is a front elevation of the marking mechanism;

Fig. 3 is a side elevation of the marking mechanism;

Fig. 4 is a partial plan of the driving arrangement for the marking and cutting mechanisms and illustrating the work table;

Fig. 5 is a front elevation of the cutting mechanism and the work table;

Fig. 6 is a detail in elevation of the driving and clutch mechanism;

Fig. 7 is a detail in plan of the driving and clutch mechanism;

Fig. 8 is a plan view of the work table illustrating three phases in the cycle of operations;

Fig. 9 is a fragmentary detail in perspective of a portion of the marking mechanism; and Fig. 10 is a fragmentary detail of the clutch.

The present machine is adapted for use with dies for marking and cutting a skin, or dies for ornamenting, by cutting, marking or perforating an upper blank, which has been previously cut from the skin. It comprises, generally, in a preferred form, a pair of power driven plungers cooperating with the dies (in the illustrated embodiment the dies are mounted on their respective plungers for movement therewith, although such dies might readily be mounted independently of the plunger) and a table or work support upon which the work is positioned, this work support being movable into and out of operating position with respect to the dies, a suitable backing medium of paper or its equivalent being provided between the work and the table. Means are provided for properly aligning, gauging and positioning the work, as well as for definitely locating and holding the table in proper position with respect to the dies.

Referring more specifically to the drawings, in which like reference numerals designate like parts, it will be observed that the machine comprises generally a base 10 having an upwardly extending frame or casing 11 which terminates in a head portion 12, such head portion overhanging the front part of the base to provide an enclosure 13.

Mounted for vertical reciprocating movement within the head 12 is a plunger 14 carrying a cutting die unit 15, which latter is positioned to operate within the enclosure 13. Secured to the frame 11 and head portion 12 and in angular relation thereto is a second casing or head portion 16, within which is mounted a plunger 17 arranged for vertical reciprocating movement through a path parallel to that of the plunger 14. The plunger 17 is positioned in the head by face plates 21, and carries a marking die unit 18.

Below the head 16 and plunger 17 is arranged a frame work 19 which, with the base 10 forms a partial enclosure for a bracket 20 secured to the base 10. The bracket 20 forms a bearing or support for a rotary work table or turret 22 which is provided with a stud 23 extending into the bracket 20 and secured to the table 22 by a plate 24 which also functions as a bearing member for the table. This work table is formed with openings or cut outs 25, at spaced intervals about its periphery, corresponding with operating positions of the table (of which three are illustrated), and the table is adapted for movement from one position to another by hand, although suitable power means may be applied if desired.

Referring particularly to Fig. 8 in which the point F indicates the front of the machine, i. e., the position at which an operator will be located, and C designates the cutting position, while the marking position is indicated at M, it will be observed that there are provided three work positioning members or gauge plates of a size slightly greater than the openings 25, and indicated respectively 26, 27 and 28. Studs 29, of which a plurality are provided for each plate, serve to accurately locate the plates on the table, over the openings, the plates having perforations to mate with the studs or pins 29. Attached to each gauge plate are abutment elements or gauge plates plates 30 which are shaped to correspond to some part or predetermined characteristic of the work pieces W, which are to be ornamented by cutting and ink marking. The plates 26, 27 and 28 are each cut out as indicated at 31, to provide openings slightly smaller than, and conforming generally to the configuration of the work, these openings being larger than the dies which work through them.

In the particular showing the work is illustrated by partial representations of quarters of a shoe, which have been placed on a plate 26, 27 or 28 and against the respective abutment gauges at 30. Plate 26 has just received fresh work, the work on plate 27 has been cut or perforated at 35, and at 28 the work has received a marking 41 in addition to the perforation 35.

The operator moves the rotatable table 22 in the direction indicated by the arrow, one-third of a turn. Notches or slots 32 are provided about the periphery of the table and a pocket 33 is mounted on the base 10 carrying the spring pressed plunger 34 in position to cooperate with the notches. When the table has been rotated the proper degree, the slot 32 to the left of the plate 26 will be engaged by the plunger 34 and the table held in this position. When this particular notch is aligned with the pin 34, the work 26 will have reached the cutting position, beneath the cutting die 15, with the work W correctly aligned with the die 15.

At the same time plate 27 will have moved to marking position, and plate 28 to the operator for removal of finished work and substitution of new work.

Operation of the machine will now effect a cutting of the work on plate 26, and a marking on 27, after which the table is again moved, and the cycle repeated.

By using a marking die separate and independent of the cutting mechanism, it is possible to mark the work in any position, irrespective of the size and shape of the cutouts. In other words, formations can be made with the cutting mechanism, and marking then placed right on top of the formations. Obviously the order of operations may be reversed and the marking effected prior to the cutting, either by reversing the movement of the table or by interchanging the marking and cutting dies, but preferably the marking and cutting operations are simultaneously performed, and synchronized with other machine operations.

In order to apply ink or other suitable ornamenting material to the marking die, there are provided a plurality of ink rolls 36 mounted on, or for movement with the table 22. It is desirable to have one roll for each operation, and in the present embodiment wherein three work positioning devices are utilized, three rolls are provided. Should this number be modified, for example four or five work positioning members be utilized, then it would be desirable to provide a like number of rolls and to increase the number of notches 32 accordingly in order that an ornamenting operation might properly be effected on each piece of work.

It should be noted that in the position of rest, with the dies removed from ornamenting position, the edges of the cutting die 15 are above the plane formed by the edges of the marking die 18 (Fig. 1), to avoid application of ink to the cutting die when the marking die is being inked. The edges of die 18 are spaced, when at rest, the proper distance from the table 22 to engage the roll 36 during its movement about the stud 23.

Beneath the table 22 (Figs. 2 and 3) is a spring mounted support carried by the frame work 19. This support comprises a plate 37 having studs 38 extending therefrom into pockets 39 and spaced from frame work 19 by springs 40 surrounding the studs 38. This support is necessary to take care of different thicknesses of leather that may be marked. The marking die does not pass through the work, and therefore if there is a variation in work thickness, this must be taken care of by a spring mounting, otherwise on thick leathers the work might be marked too heavily as compared with a mark on lighter leathers.

The plungers 14 and 17 are power operated, and to this end there is provided a bracket 42 (Fig. 4) extending from the head 12 having an angularly disposed arm 43 within which is fixed a shaft or spindle 44. Loosely mounted on the shaft is a driving pulley 45 which may be connected to any convenient source of power. Also carried by the shaft 44 is a clutch 46, the hub 50 of which extends through pulley 45. Gears 47 and 48 are mounted for free rotation on shaft 44. The gear 48 is pinned or keyed by means of clutch keys 49 to the clutch 46, (Fig. 4) while the gear 47 is keyed to the outer end of the hub 50. Pulley 45 may be clutched as hereinafter described, by means of the clutch 46, to the gears 48 and 47.

Gear 52 connected to the marking mechanism is arranged to mesh with gear 47 and is carried by a stub shaft 53. A gear 54 connected with the cutting mechanism is arranged to mesh with gear 48 and is carried by shaft 55 extending through the bracket 42. Suitable driving connections are provided from the shafts 53 and 55 to the respective plungers, and thus it will be noted that when power is applied by clutching the pulley 45 to the gears 47—48, the marking and cutting mechanisms will be simultaneously operated.

The gear 52 is provided with an eccentrically formed hub 56 freely mounted on the stub shaft 53 which is fixedly mounted in the head portion 16 of the machine. The plunger 17 is connected to the eccentric hub 56 by means of an eccentric strap 58 and a crank pin 59. This crank pin is fixedly mounted in the plunger 17 and the eccentric strap rotates freely thereon.

Referring now to Figs. 6, 7 and 10, which show details of the clutch and clutch control mechanism, it will be observed that there is provided a bracket 57, extending from the head 12, and supporting the control mechanism which includes a clutch dog indicated at 60 to which is connected a treadle rod 61.

The pulley 45 is provided with lugs 62, engageable by a spring pressed sliding key 63. The key 63 is held from movement into clutching position by means of a spring urged, sliding clutch release key 65 which carries a spring latch 66 engageable by the dog 60.

When the treadle rod 61 is depressed the plate or dog 60 partakes of a pivotal movement about its supporting stud and by engagement with the latch 66 forces the clutch release key 65 downward, thus releasing the spring pressed key 63 which under action of its spring 64, immediately contacts with the lugs 62 of the pulley to start operation of the machine. Before the clutch has made one complete revolution, the dog 60 will have continued its downward movement and slid past the end of the key 66, thus releasing the key which through the action of its spring immediately returns to its original position so that the clutch will make but a single revolution. Upon release of the treadle the dog 60 will return to its original position under action of a conventional treadle spring (not shown), passing by the yieldable spring latch 66. As shown in Fig. 10 the key 63 has a tapered slot and is thrown out of engagement with the pulley as the clutch makes one revolution.

The details of the clutch and clutch actuating mechanism, specifically form no part of this invention, and reference may be made to my copending application Serial No. 478,264, filed August 27th, 1930 for a more complete description thereof.

Indicated generally at 68 is a mechanism for feeding a backing material 67 under the table 22 and beneath the work, this material serving not only to protect the cutting edges of the die, but to ensure a clean cut. It will be evident that the base 10 forms a firm backing for the cutting operation, the material 67 resting thereon and the openings 31, over which the work is supported, registering with the material 67 and the die. While the structural details of this embodiment, illustrate the paper 67, feeding in the direction of the arrow, Fig. 1, and passing under a portion of a rotatable table and over an anvil or support, obviously this arrangement is susceptible of modification, to accommodate a variety of supports, as shown in my copending application, above mentioned.

Having thus described my invention the operation thereof will be readily apparent. A work piece having been placed on one of the plates 26, the table is then moved until such plate and work are beneath the cutting die whereupon the treadle rod 61 will be depressed to connect the clutch 46 to the driving pulley 45, and thereby operate the cutting mechanism. The marking mechanism is of course being operated at the same time. As the table is rotated to move the work from one operating position to another the rollers 36 will ink the marking die preparatory to the next step in the cycle of operations.

Having thus described my invention what I claim as new and desire to secure by Letters Patent of the United States, is:—

1. A machine for ornamenting shoe parts comprising a support, means to position work accurately on said support, a frame extending above said support, movable marking and cutting dies carried by said frame and positioned in spaced relation horizontally over said support, said support having means cooperative with the cutting die to effect a cutting operation, and being constructed and arranged to cooperate with the marking die to effect a marking operation, means to initiate movement of said dies toward the work on said support, and means to provide relative movement between said support and the extending frame whereby the relative position of work on the support and the dies may be varied.

2. A machine for ornamenting shoe parts comprising a support, means to position work accurately on said support, a frame extending above said support, movable marking and cutting dies carried by said frame and positioned in spaced relation horizontally over said support, means on said support to apply ink to said marking die, said support having means cooperative with the cutting die to effect a cutting operation, and being constructed and arranged to cooperate with the marking die to effect a marking operation, means to initiate movement of said dies toward the work on said support, and means to provided relative movement between said support and the extending frame whereby the relative position of work on the support and the dies may be varied.

3. A machine for ornamenting shoe parts comprising a support, means to position work accurately on said support, a frame extending above said support, a marking die and a cutting die carried by said frame and positioned in spaced relation horizontally over said support, means on said support to apply ink to said marking die, said support having means cooperative with the cutting die to effect a cutting operation, and being constructed and arranged to cooperate with the marking die to effect a marking operation means to move said cutting and marking dies simultaneously toward the work on said support, and means to provide relative movement between said support and the extending frame whereby the relative position of work on the support and the dies may be varied.

4. A machine for ornamenting shoe parts comprising a support, means to position work accurately on said support, a frame extending above said support, a plurality of heads carried by said frame, a reciprocable plunger mounted for movement in each head, a marking die carried by one of said plungers, a cutting die carried by the other of said plungers, said dies being positioned in spaced relation horizontally over said support, said support having means cooperative with the cutting die to effect a cutting operation, and being constructed and arranged to cooperate with the marking die to effect a marking operation means to initiate movement of said plungers and dies toward the work on said support, and means to provide relative movement between said support and the extending frame whereby the relative position of work on the support and the dies may be varied.

5. A machine for ornamenting shoe parts, comprising a rotary table, means to position work accurately on said table, a frame extending above said support, a marking die unit and a cutting die unit carried by said frame and positioned in spaced relation about the axis of said table and in a plane parallel to the table, said table having means cooperative with the cutting die unit to effect a cutting operation, and being constructed and arranged to cooperate with said marking die unit to effect a marking operation, power actuated means effective to move said dies toward the work on the table, and means connecting said power actuating means to the respective dies to synchronize movements of the dies.

6. A machine for ornamenting shoe parts, comprising a rotary table, means on said table to position a plurality of work pieces accurately on the table in predetermined spaced relation about the axis thereof, a marking station and a cutting station, relatively spaced about said table, a distance equal to that between two pieces of work, means to simultaneously mark one piece of work at the marking station and to perforate another piece of work at the cutting station, said table having means cooperative with the marking and perforating means to effect the perforating and marking operations.

7. A machine for ornamenting shoe parts, comprising a rotatable table, means on said table to position a plurality of work pieces accurately on the table in predetermined spaced relation about the axis thereof, a marking station and a cutting station, relatively spaced about said table a distance equal to that between two pieces of work, means to accurately position said table relative to said stations whereby to locate work at each station, and means to simultaneously mark one piece of work at the marking station and to perforate another piece of work at the cutting station.

8. A machine for ornamenting shoe parts, comprising a rotary table, means on said table to position a plurality of work pieces accurately on the table in predetermined spaced relation about the axis thereof, a marking station including a marking die, and a cutting station including a cutting die relatively spaced about the table a distance equal to that between two pieces of work, means to accurately position said table relative to said stations whereby to locate work at each station, means adjacent the location of each piece of work to ink the marking die, and means to simultaneously mark one piece of work at the marking station, and to perforate another piece of work at the cutting station.

9. A machine for ornamenting shoe parts, comprising a rotary table, means on said table to position a plurality of work pieces accurately on the table in predetermined spaced relation about the axis thereof, a marking station including a marking die, and a cutting station including a cutting die relatively spaced about the table a distance equal to that between two pieces of work, means to accurately position said table relative to said stations whereby to locate work at each station, means on the table adjacent the location of each piece of work and movable therewith, to ink the marking die, and means to mark one piece of work at the marking station and to perforate another piece of work at the cutting station, in synchronized relation.

10. A machine for ornamenting shoe parts comprising a support, means to position work accurately on said support, a frame extending above said support, movable marking and cutting dies carried by said frame and positioned in spaced relation horizontally over said support, resilient work supporting means below said marking die and cooperative with said work support to accommodate variable thicknesses of work, and means to initiate movement of said dies toward the work on said support.

11. A machine for ornamenting shoe parts comprising a support, a gauge carried by the support and cooperating with the work to position the latter in predetermined position on said support, a frame extending above said support, movable marking and cutting dies carried by said frame and positioned in spaced relation horizontally over said support, said support having means cooperative with the cutting die to effect a cutting operation, and being constructed and arranged to cooperate with the marking die to effect a marking operation, and means to initiate movement of said dies toward the work on said support.

12. A machine for ornamenting shoe parts comprising a movable support, means to position work accurately on said support, a frame extending above said support, movable marking and cutting dies carried by said frame and positioned in spaced relation horizontally over said support, means on said frame cooperative with said support to accurately locate and hold said support in predetermined position relative to said dies, and means to initiate movement of said dies toward the work on said support.

13. A machine for ornamenting shoe parts comprising a movable support having a plurality of notches therein and arranged in predetermined spaced relation, an abutment gauge carried by the support and cooperative with the work to position the latter on said support, a frame extending above said support, movable marking and cutting dies carried by said frame and positioned in spaced relation horizontally over said support, a spring pressed detent on said frame cooperative with one of said notches thereby to accurately locate and hold said support in predetermined position relative to said dies, and means to initiate movement of said dies toward the work on said support.

14. A machine for ornamenting shoe parts comprising a support, means to position work accurately on said support, a frame extending above said support, a plurality of heads carried by said frame, a reciprocable plunger mounted for movement in each head, a marking die carried by one of said plungers, a cutting die carried by the other of said plungers, and means to actuate said plungers including a driving member positioned between the vertical plane of the heads, a clutch located adjacent said driving member and a clutch control means therefor, said clutch being effective to connect both of said heads to said driving member for simultaneous movement toward and from the work.

15. A machine for ornamenting shoe parts comprising a support, means to position work accurately on said support, a frame extending above said support, a plurality of heads carried by said frame and positioned over said support, a marking die movably mounted in one of said heads, a cutting die movably mounted in another of said heads, a bracket carried by said frame, a shaft mounted in said bracket and having a gear thereon, said shaft being operatively connected to said marking die, a bracket extending from the marking head and carrying a gear operatively connected to the marking die, and means to actuate the marking gear and cutting gear comprising a second shaft carried by said first mentioned bracket, a driving member thereon, and means including a manually actuated clutch effective to connect said driving member to said gears.

16. A machine for ornamenting shoe parts comprising a support, means to position work accurately on said support, a frame extending above said support, a plurality of heads carried by said frame, a reciprocable plunger mounted for movement in each head, a marking die carried by one of said plungers, a cutting die carried by the other of said plungers, means to actuate said plungers including a driving member positioned between the heads, and a clutch located adjacent said driving member, said clutch being effective to connect both of said heads to said driving member for simultaneous movement toward and from the work, and means to lock said clutch against operation after a single reciprocation of said plungers.

17. A machine for ornamenting shoe parts comprising a support, means to position work accurately on said support, a frame extending above said support, movable marking and cutting dies carried by said frame and positioned in spaced relation horizontally over said support, said marking die being spaced a lesser distance from the support than the cutting die, means movable with said support to apply ink to said marking die, and means to initiate movement of said dies toward the work on said support.

18. A machine for ornamenting shoe parts comprising a support, means to position work accurately on said support, a frame extending above said support, plungers reciprocably mounted in said frame, movable marking and cutting dies carried by said plungers and positioned in spaced relation horizontally over said support, means including an operator controlled clutch to initiate movement of said plungers and dies toward the work on said support, and automatic means to lock said clutch against operation after a single reciprocation of said plungers.

19. A machine for ornamenting shoe parts comprising a work support, a frame extending above said support, movable marking and cutting dies carried by said frame and positioned in spaced relation horizontally over said support, gauge means carried by said support and located in predetermined cooperative relation to said dies, for aligning work accurately with respect to each of said dies, said support having means cooperative with the cutting die to effect a cutting operation, and being constructed and arranged to cooperate with the marking die to effect a marking operation and means to initiate movement of said dies toward the work on said support.

20. A machine for ornamenting shoe parts comprising a work support, a frame extending above said support, movable marking and cutting dies carried by said frame and positioned in spaced relation horizontally over said support, gauge means carried by said support and located in predetermined cooperative relation to said dies, for aligning work accurately with respect to each of said dies, said support having means cooperative with the cutting die to effect a cutting operation, and being constructed and arranged to cooperate with the marking die to effect a marking operation, means to initiate movement of said dies toward the work on said support, and means to provide relative movement between said support and the extending frame whereby the relative position of work on the support and the dies may be varied.

21. A machine for ornamenting shoe parts, comprising a work support, a frame extending above said support, movable marking and cutting dies carried by said frame and positioned in spaced relation horizontally over said support, means on said support to apply ink to said marking die, gauge means carried by said support and located in predetermined cooperative relation to said dies, for aligning work accurately with respect to each of said dies, and means to initiate movement of said dies toward the work on said support.

22. A machine for ornamenting shoe parts, comprising a work support, a frame extending above said support, movable marking and cutting dies carried by said frame and positioned in spaced relation horizontally over said support, means on said support to apply ink to said marking die, gauge means carried by said support and located in predetermined cooperative relation to said dies, for aligning work accurately with respect to each of said dies, means to initiate movement of said dies toward the work on said support, and means to provide relative movement between said support and the extending frame whereby the relative position of work on the support and the dies may be varied.

23. A machine for ornamenting shoe parts, comprising a work support, a frame extending above said support, a marking die and a cutting die carried by said frame and positioned in spaced relation horizontally over said support, means on said support to apply ink to said marking die, gauge means carried by said support and located in predetermined cooperative relation to said die, for aligning work accurately with respect to each of said dies, and means to move said cutting and marking dies simultaneously toward the work on said support.

24. A machine for ornamenting shoe parts, comprising a work support, a frame extending above said support, a marking die and a cutting die carried by said frame and positioned in spaced relation horizontally over said support, means on said support to apply ink to said marking die, gauge means carried by said support and located in predetermined cooperative relation to said die, for aligning work accurately with respect to each of said dies, means to move said cutting and marking dies simultaneously toward the work on said support, and means to provide relative movement between said support and the extending frame whereby the relative position of work on the support and the dies may be varied.

25. A machine for ornamenting shoe parts, comprising a work support, a frame extending above said support, a plurality of heads carried by said frame, a reciprocable plunger mounted for movement in each head, a marking die carried by one of said plungers, a cutting die carried by the other of said plungers, said dies being positioned in spaced relation horizontally over said support, gauge means carried by said support and located in predetermined cooperative relation to said dies for aligning work accurately with respect to each of said dies, and means to initiate movement of said plungers and dies toward the work on said support.

26. A machine for ornamenting shoe parts, comprising a work support, a frame extending above said support, a plurality of heads carried by said frame, a reciprocable plunger mounted for movement in each head, a marking die carried by one of said plungers, a cutting die carried by the other of said plungers, said dies being positioned in spaced relation horizontally over said support, gauge means carried by said support and located in predetermined cooperative relation to said dies for aligning work accurately with respect to each of said dies, means to initiate movement of said plungers and dies toward the work on said support, and means to provide relative movement between said support and the extending frame whereby the relative position of work on the support and the dies may be varied.

27. A machine for ornamenting shoe parts, comprising a work support, a frame extending above said support, movable marking and cutting dies carried by said frame and positioned in spaced relation horizontally over said support, gauge means located above the work supporting surface of said support and in predetermined cooperative relation to said dies for aligning work accurately with respect to each of said dies, said support having means cooperative with the cutting die to effect a cutting operation, and being constructed and arranged to cooperate with the marking die to effect a marking operation, and means to initiate movement of said dies toward the work on said support.

BENJAMIN W. FREEMAN.